US012812430B2

(12) United States Patent
Kim et al.

(10) Patent No.: US 12,812,430 B2
(45) Date of Patent: Nov. 24, 2026

(54) METHOD AND DEVICE FOR TRANSMITTING/RECEIVING CHANNEL STATE INFORMATION IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR); Seongwon Go, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 18/290,682

(22) PCT Filed: Jul. 18, 2022

(86) PCT No.: PCT/KR2022/010432
§ 371 (c)(1),
(2) Date: Jan. 19, 2024

(87) PCT Pub. No.: WO2023/003295
PCT Pub. Date: Jan. 26, 2023

(65) Prior Publication Data

US 2025/0096986 A1 Mar. 20, 2025

(30) Foreign Application Priority Data

Jul. 20, 2021 (KR) ........................ 10-2021-0095176

(51) Int. Cl.
*H04B 7/024* (2017.01)
*H04B 7/06* (2006.01)
(Continued)

(52) U.S. Cl.
CPC ............ *H04W 24/10* (2013.01); *H04B 7/024* (2013.01); *H04B 7/0639* (2013.01); *H04B 17/24* (2015.01);
(Continued)

(58) Field of Classification Search
CPC ............... H04B 7/02–12; H04B 17/0082–409; H04L 5/0001–0098; H04W 8/22–245;
(Continued)

(56) References Cited

U.S. PATENT DOCUMENTS

2021/0058113 A1 2/2021 Jung et al.
2021/0126687 A1* 4/2021 Venugopal ............ H04W 24/10
2023/0056106 A1* 2/2023 Hao ...................... H04W 24/08

FOREIGN PATENT DOCUMENTS

WO WO 2020/092468 5/2020
WO WO 2021/093194 5/2021

OTHER PUBLICATIONS

International Search Report and Written Opinion in Appln. No. PCT/KR2022/010432, mailed on Oct. 20, 2022, 6 pages (with English translation).

(Continued)

*Primary Examiner* — Timothy J Weidner
(74) *Attorney, Agent, or Firm* — Fish & Richardson P.C.

(57) ABSTRACT

A method and a device for transmitting/receiving channel state information (CSI) in a wireless communication system are disclosed. A method by which a terminal transmits CSI in a wireless communication system, according to an embodiment of the present disclosure, may comprise the steps of: receiving configuration information related to CSI reporting; receiving a CSI-reference signal (RS) from at least one CSI-RS resource corresponding to the configuration information; and transmitting the CSI on the basis of at least one CSI-RS and the configuration information.

11 Claims, 11 Drawing Sheets

(51) Int. Cl.

| | |
|---|---|
| ***H04B 17/20*** | (2015.01) |
| ***H04B 17/24*** | (2015.01) |
| ***H04L 5/00*** | (2006.01) |
| ***H04W 8/22*** | (2009.01) |
| ***H04W 24/08*** | (2009.01) |
| ***H04W 24/10*** | (2009.01) |
| ***H04W 72/044*** | (2023.01) |
| ***H04W 84/02*** | (2009.01) |
| ***H04W 88/02*** | (2009.01) |
| ***H04W 88/08*** | (2009.01) |
| ***H04W 92/02*** | (2009.01) |
| ***H04W 92/10*** | (2009.01) |

(52) U.S. Cl.
CPC ......... *H04B 17/252* (2023.05); *H04L 5/0057* (2013.01); *H04L 5/0091* (2013.01); *H04W 8/22* (2013.01); *H04W 24/08* (2013.01); *H04W 72/046* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ........... H04W 24/02–10; H04W 36/0005–385; H04W 72/02–569; H04W 84/02–16; H04W 88/02–12; H04W 92/02–04; H04W 92/10
See application file for complete search history.

(56) References Cited

OTHER PUBLICATIONS

Nokia, Nokia Shanghai Bell, “Enhancement on CSI measurement and reporting,” GPP TSG RAN WG1 Meeting #103-e, R1-2008909, e-Meeting, Oct. 26-Nov. 13, 2020, 21 pages.
Qualcomm Incorporated, “CSI enhancements: MTRP and FR1 FDD reciprocity,” 3GPP TSG RAN WG1 #104-e, R1-2101452, e-Meeting, Jan. 25-Feb. 8, 2021, 14 pages.
Extended European Search Report in European Appin. No. 22846165.3, mailed on Jun. 10, 2025, 9 pages.
Lenovo, Motorola Mobility, “Discussion on enhancement for multi-TRP/multi-panel transmission,” R1-1810571, 3GPP TSG RAN WG1 Meeting #94bis, Chengdu, China, Oct. 8-12, 2018, 7 pages.
Qualcomm Incorporated, “CSI enhancements: MTRP and FR1 Fdd reciprocity,” R1-2006796, 3GPP Tsg Ran WG1 #102-e, e-Meeting, Aug. 17-28, 2020, 11 pages.

* cited by examiner

METHOD AND DEVICE FOR TRANSMITTING/RECEIVING CHANNEL STATE INFORMATION IN WIRELESS COMMUNICATION SYSTEM

CROSS-REFERENCE TO RELATED APPLICATIONS

This application is a National Stage application under 35 U.S.C. § 371 of International Application No. PCT/KR2022/010432, filed on Jul. 18, 2022, which claims the benefit of Korean Application No. 10-2021-0095176, filed on Jul. 20, 2021. The disclosures of the prior applications are incorporated by reference in their entirety.

TECHNICAL FIELD

The present disclosure relates to a wireless communication system, and more particularly, to a method and apparatus for performing transmission and reception of channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for performing transmission and reception of channel state information in a wireless communication system.

An additional technical object of the present disclosure is to provide a method and apparatus for calculating and transmitting and receiving channel state information based on CMR configuration and port group configuration for a specific RS.

The technical objects to be achieved by the present disclosure are not limited to the above-described technical objects, and other technical objects which are not described herein will be clearly understood by those skilled in the pertinent art from the following description.

A method for transmitting channel state information (CSI) by a user equipment (UE) in a wireless communication system according to an aspect of the present disclosure may comprise: receiving configuration information related to CSI reporting; receiving a CSI-RS on at least one CSI-reference signal (RS) resource corresponding to the configuration information; and transmitting CSI based on the at least one CSI-RS and the configuration information. Herein, based a specific CSI-RS resource among the at least one CSI-RS resource being configured as one channel measurement resource (CMR), CSI for the one CMR may be calculated based on a first port group and a second port group of the specific CSI-RS resource, and the first port group and the second port group may be associated with a first spatial parameter and a second spatial parameter, respectively.

A method for receiving channel state information (CSI) by a base station in a wireless communication system according to an additional aspect of the present disclosure may comprise: transmitting configuration information related to CSI reporting; transmitting a CSI-RS on at least one CSI-reference signal (RS) resource corresponding to the configuration information; and receiving CSI based on the at least one CSI-RS and the configuration information. Herein, based a specific CSI-RS resource among the at least one CSI-RS resource being configured as one channel measurement resource (CMR), CSI for the one CMR may be calculated based on a first port group and a second port group of the specific CSI-RS resource, and the first port group and the second port group may be associated with a first spatial parameter and a second spatial parameter, respectively.

According to the present disclosure, a method and an apparatus for performing transmission and reception of channel state information in a wireless communication system may be provided.

According to the present disclosure, a method and apparatus for calculating and transmitting and receiving channel state information based on CMR configuration and port group configuration for a specific RS may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
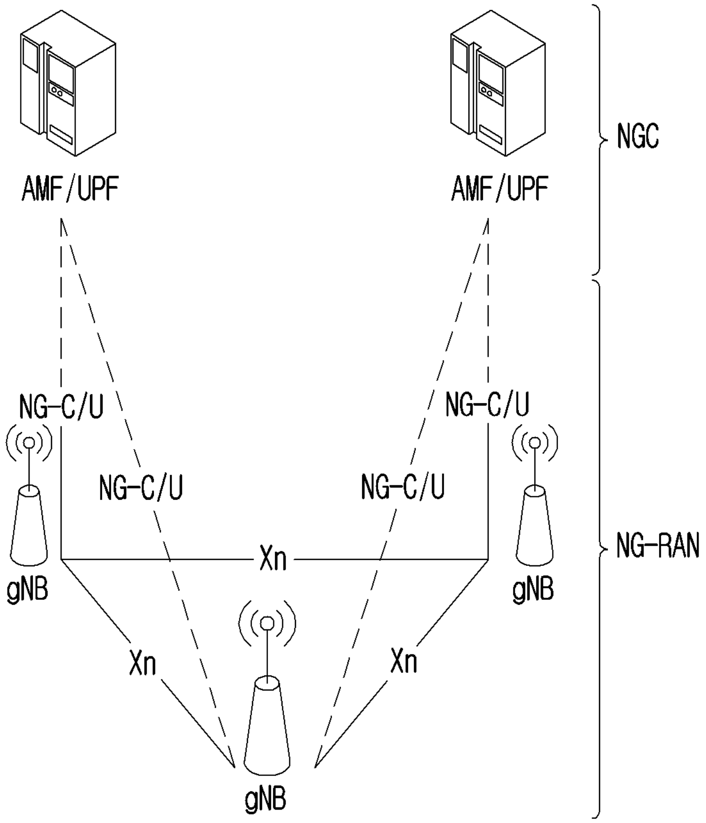
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
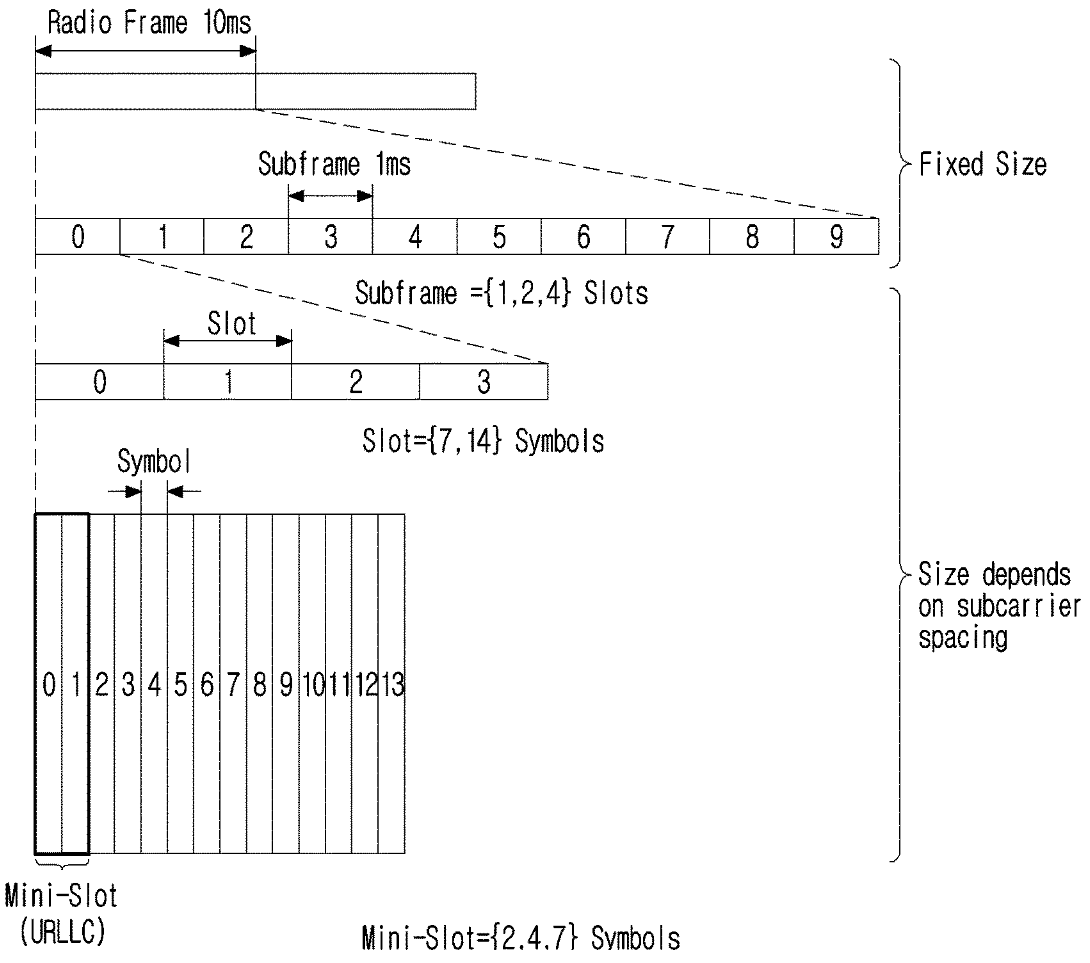
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot 10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^{\mu}\in\{0, \ldots, N_{slot}^{subframe,\mu}-1\}$ in a subframe and are numbered in an increasing order of $n_{s,f}^{\mu}\in\{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,u}$ | $N_{slot}^{subframe,u}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,u}$ | $N_{slot}^{subframe,u}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
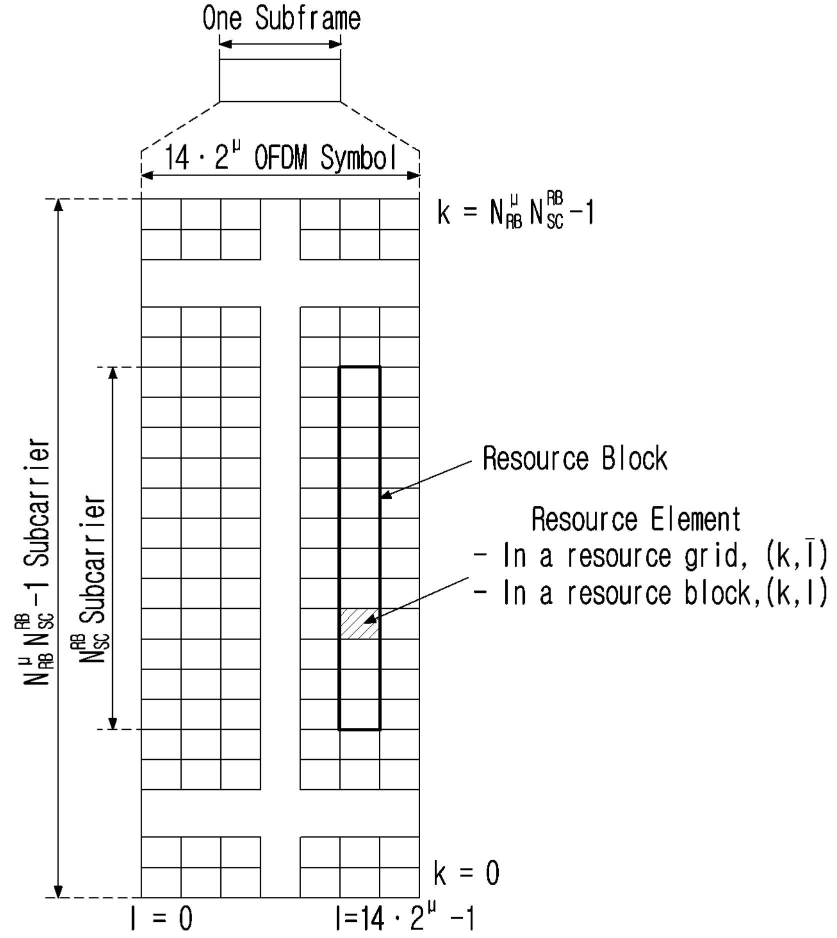
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14\cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu}\leq N_{RB}^{max,\mu}$. The $N_{RB}^{max,\mu}$ represents a maximum transmission bandwidth, which may be different between an uplink and a downlink as well as between numerologies. In this case, one resource grid may be configured per u and antenna port p. Each element of a resource grid for u and an antenna port p is referred to as a resource element and is uniquely identified by an index pair (k,l'). Here, $k=0, \ldots, N_{RB}^{\mu}N_{sc}^{RB}-1$ is an index in a frequency domain and $l'=0, \ldots, 2^{\mu}N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n^{\mu}_{CRB} = \left\lfloor \frac{k}{N^{RB}_{sc}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n^{\mu}_{CRB} = n^{\mu}_{PRB} + N^{start,\mu}_{BWP,i} \quad \text{[Equation 2]}$$

$N_{BWP,i}^{start,\mu}$ is a common resource block that a BWP starts relatively to common resource block 0.

Figure 4:
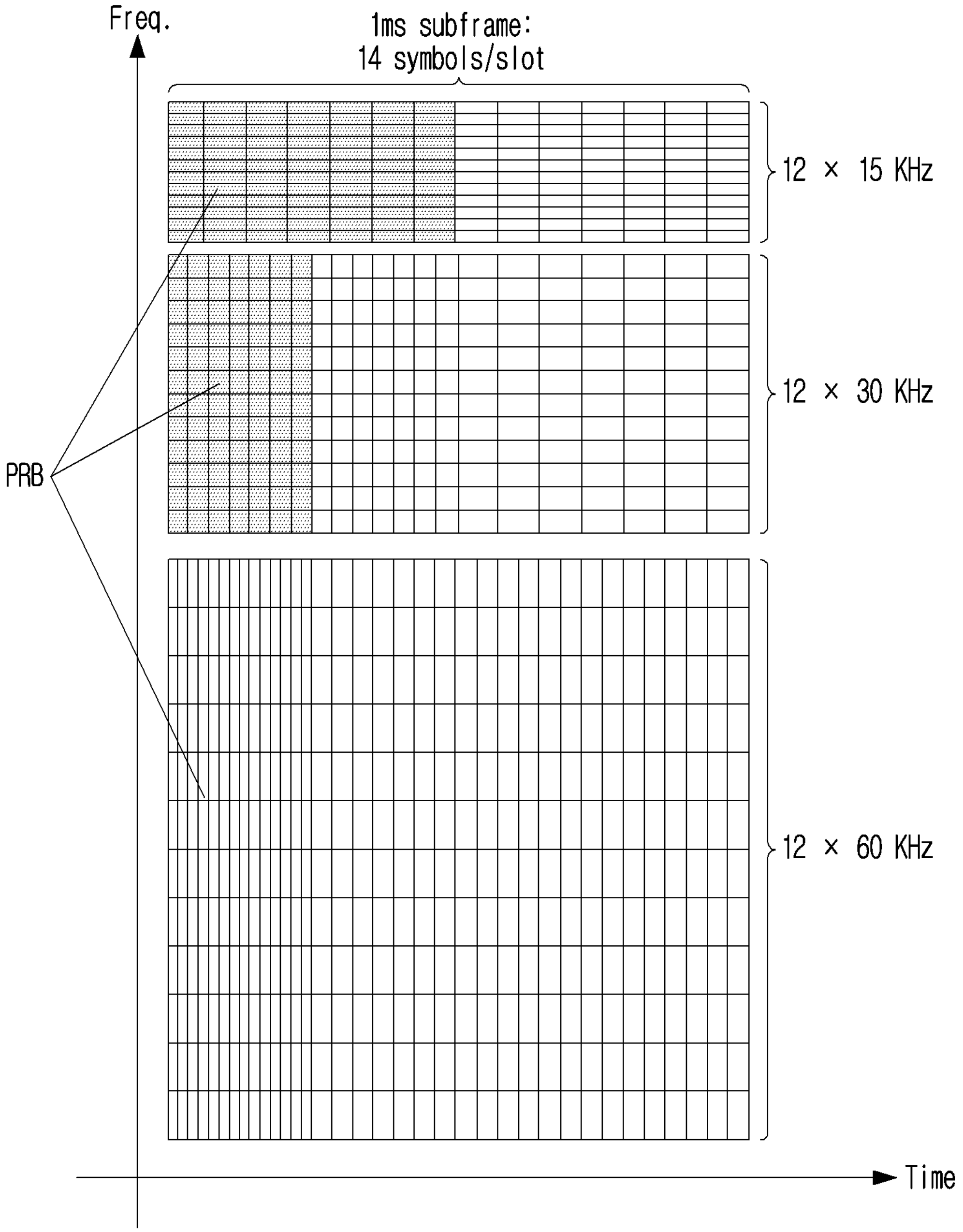
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
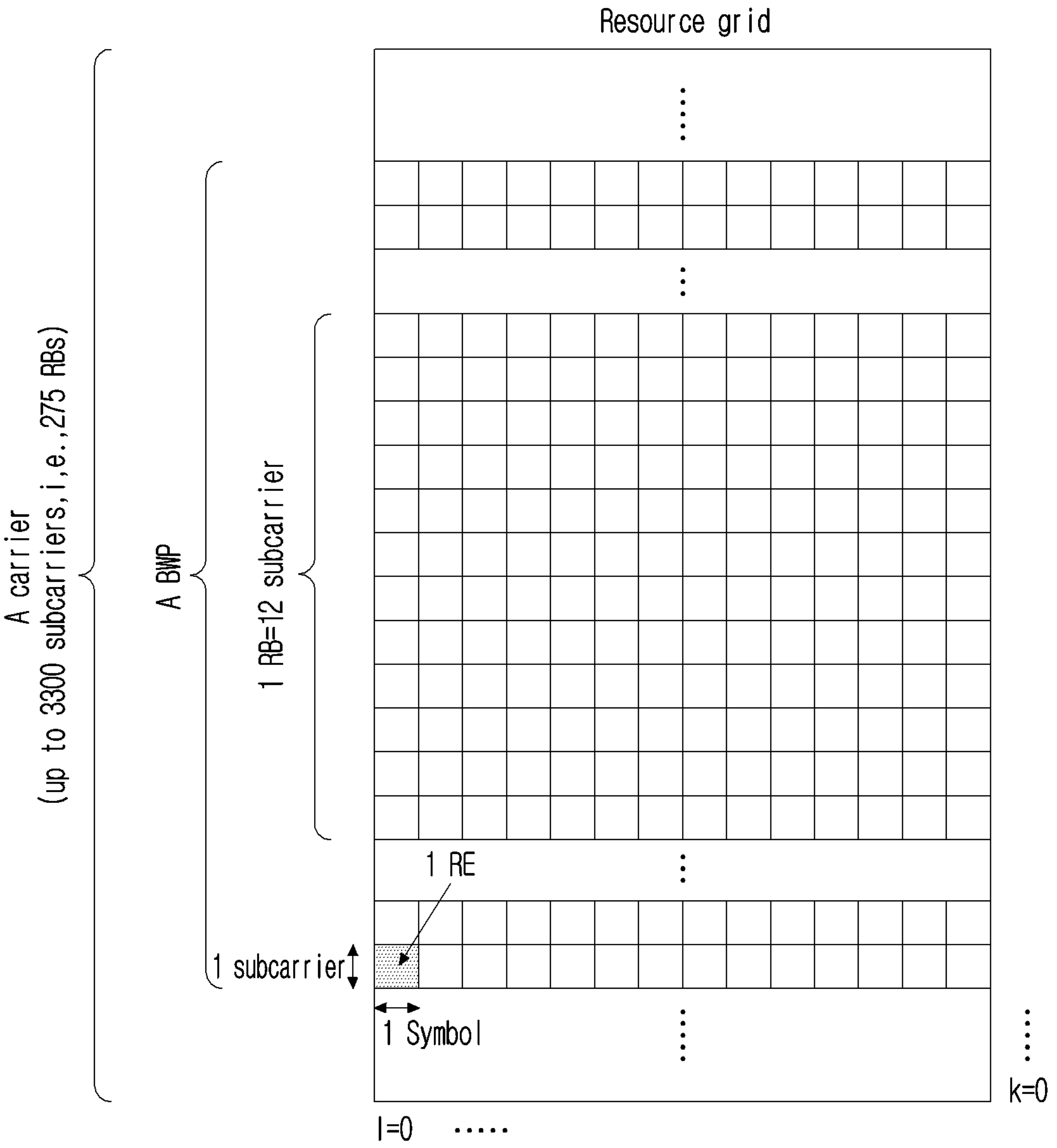
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
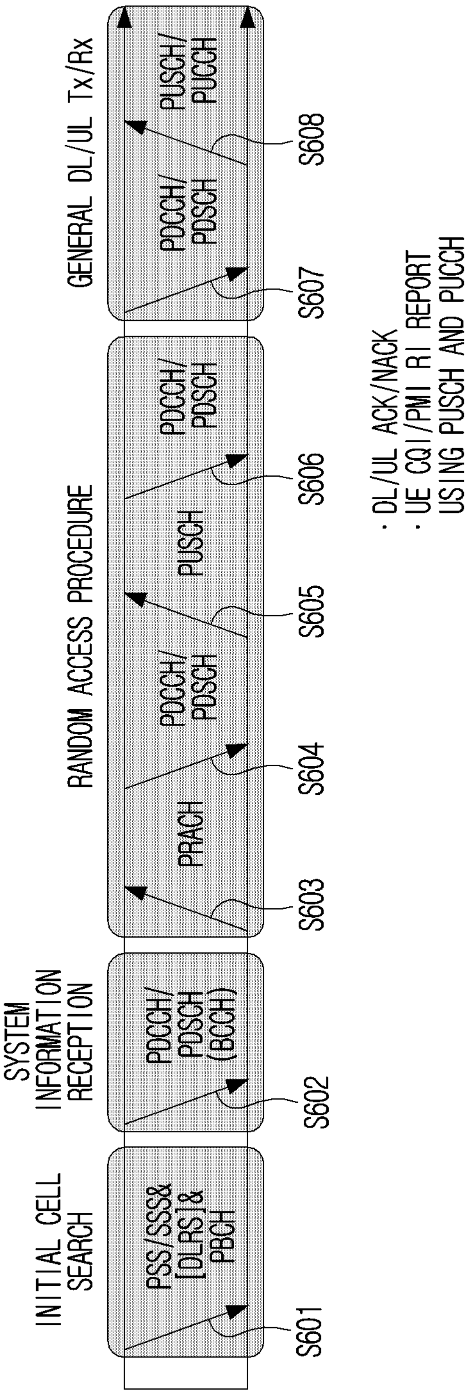
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number(S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or
QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or
QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Multiple TRP (M-TRP) Related Operation(s)

Figure 7:
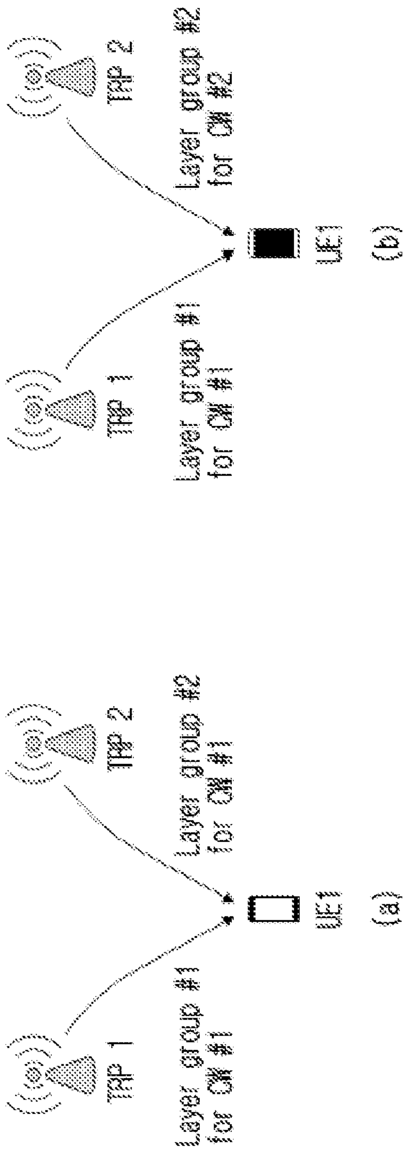
FIG. 7 illustrates a multiple TRP transmission scheme in a wireless communication system to which the present disclosure may be applied.

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to the method illustrated in FIGS. 7(*a*) and 7(*b*) above, as the same TB is repeatedly transmitted through different layer groups and each layer group is transmitted by different TRP/panel, the data reception probability of the UE may be increased. This is referred to as a Spatial Division Multiplexing (SDM)-based M-TRP URLLC transmission scheme. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

M-TRP transmission method in which M TRPs transmit data to one terminal may be broadly divided into two types: eMBB M-TRP transmission method, which is a method to increase transmission rate, and URLLC M-TRP transmission method, which is a method to increase reception success rate and reduce latency.

Also from a DCI transport perspective: the M-TRP transmission method can be divided into i) an M-DCI (multiple DCI)-based M-TRP transmission method in which each TRP transmits a different DCI, and ii) an S-DCI (single DCI)-based M-TRP transmission method in which one TRP transmits a DCI. For example, in the case of S-DCI, all scheduling information about data transmitted by M-TRP must be transmitted through one DCI, so it can be used in an ideal BH (ideal BackHaul) environment where dynamic cooperation between two TRPs is possible.

DL MTRP URLLC means that multiple TRPs transmit the same data/DCI by using a different layer/time/frequency resource. For example, TRP 1 transmits the same data/DCI in resource 1 and TRP 2 transmits the same data/DCI in resource 2.

That is, when the DL M-TRP URLLC transmission scheme is configured, the UE may receive the same data/DCI using different space/time/frequency resources. At this time, the UE may receive an indication of the QCL RS/type (i.e., DL TCI state) used in the space/time/frequency resource receiving the corresponding data/DCI from the base station.

For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

UL M-TRP URLLC transmission method refers to a method in which multiple TRPs receive the same data/UCI from one terminal using different space/time/frequency resources. For example, TRP 1 may receive the same data/UCI from the UE on resource 1, and TRP 2 may receive the same data/UCI from the terminal on resource 2. Additionally, TRP 1 and TRP 2 may share data/UCI received from the UE through a backhaul link (connected between TRPs).

That is, when the UL M-TRP URLLC transmission scheme is configured, the UE may transmit the same data/UCI to each TRP using different space/time/frequency resources. At this time, the UE may be indicated by the base station of the Tx beam and Tx power (i.e., UL TCI state) to be used in space/time/frequency resources transmitting the same data/UCI. For example, when the same data/UCI is transmitted in resource 1 and resource 2, the UE may be indicated by the base station of the UL TCI state used in resource 1 and the UL TCI state used in resource 2. Such UL MTRP URLLC may be applied to PUSCH/PUCCH.

Also, in describing the present disclosure, when receiving/transmitting data/DCI/UCI through a specific space/time/frequency resource, using (or mapping) a specific TCI state (or TCI) may mean, in the case of DL, that a channel is estimated from a DMRS using a QCL type and a QCL RS indicated by a specific TCI state in a specific space/time/frequency resource, and data/DCI/UCI is received/demodulated through the estimated channel.

In addition, when receiving/transmitting data/DCI/UCI through specific space/time/frequency resources, using (or mapping) a specific TCI state (or TCI) means, in the case of UL, may mean that DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information and the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of the UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (up to 32 parameter value sets per cell), q_d (indices of DL RS resources for PL (path loss) measurement (up to 4 measurements per cell), or/and I (closed loop power control process index (up to 2 processes per cell)).

As another embodiment of the present disclosure, the M-TRP eMBB transmission scheme refers to a scheme in which M-TRP transmits different data/DCI using different space/time/frequency resources. If the M-TRP eMBB transmission method is configured, the UE may receive a plurality of TCI states from the base station through DCI, and may assume that data received using the QCL RS indicated by each of the plurality of TCI states is different data.

In addition, since the RNTI for M-TRP URLLC and the RNTI for M-TRP eMBB are separately used, the UE may determine whether specific transmission/reception is M-TRP URLLC transmission/reception or M-TRP eMBB transmission/reception. For example, when the RNTI for URLLC is used and CRC is masked for DCI, the UE may recognize the transmission as URLLC transmission. And, when the RNTI for eMBB is used and CRC masked for DCI, the UE may identify the corresponding transmission as eMBB transmission. As another example, the base station may configure the M-TRP URLLC transmission/reception method or the M-TRP eMBB transmission/reception method to the UE through new signaling.

For convenience of description of the present disclosure, it is assumed that 2 TRPs cooperate with each other to perform transmission/reception operations, but is not limited thereto. That is, the present disclosure may be extended and applied even in a multiple TRP environment of 3 or more, and may be extended and applied even in an environment where transmission/reception is performed using different panels or beams in the same TRP. The UE may recognize different TRPs as different TCI states. When the UE transmits/receives data/DCI/UCI using TCI state 1, it means that data/DCI/UCI/is transmitted/received from (or through TRP 1).

The present disclosure may be utilized in a situation in which an M-TRP cooperatively transmits a PDCCH (repeatedly transmits the same PDCCH or transmits dividedly). In addition, the present disclosure may be utilized in a situation where the M-TRP cooperatively transmits PDSCH or cooperatively receives PUSCH/PUCCH.

Also, in describing the present disclosure, repetitive transmission of the same PDCCH by a plurality of base stations (i.e., M-TRPs) may mean that the same DCI is transmitted through a plurality of PDCCH candidates, and it means that multiple base stations repeatedly transmit the same DCI. Here, two DCIs having the same DCI format/size/payload can be regarded as the same DCI.

Alternatively, if the scheduling result is the same even though the payloads of the two DCIs are different, the two DCIs may be regarded as the same DCI. For example, the time domain resource allocation (TDRA) field of the DCI may relatively determine a slot/symbol position of data and a slot/symbol position of A (ACK)/N (NACK) based on a DCI reception time point.

In this case, when the DCI received at time n and the DCI received at time n+1 indicate the same scheduling result to the UE, the TDRA fields of the two DCIs are different, and as a result, the DCI payloads are different. Accordingly, when the scheduling result is the same even though the payloads of the two DCIs are different, the two DCIs may be regarded as the same DCI. Here, the number of repetitions R may be directly instructed by the base station to the UE or mutually promised.

Alternatively, even if the payloads of the two DCIs are different and the scheduling results are not the same, if the scheduling result of one DCI is a subset of the scheduling result of the other DCI, the two DCIs may be regarded as the same DCI.

For example, if the same data is TDM and repeatedly transmitted N times, DCI 1 received before the first data indicates data repetition (or scheduling) N times, and DCI 2 received before the second data indicates N−1 data repetition (scheduling). At this time, the scheduling result (or data) of DCI 2 becomes a subset of the scheduling result (or data) of DCI 1, and both DCIs have scheduling results for the same data. Therefore, even in this case, the two DCIs may be regarded as the same DCI.

And, in explaining the present disclosure, the operation of dividing and transmitting the same PDCCH by a plurality of base stations (i.e., M-TRP) may mean that one DCI is transmitted through one PDCCH candidate, but TRP 1 transmits some resources defined for the corresponding PDCCH candidate, and TRP 2 transmits the remaining resources.

For example, when TRP 1 and TRP 2 divide and transmit PDCCH candidates corresponding to the aggregation level m1+m2, PDCCH candidates are divided into PDCCH candidate 1 corresponding to aggregation level m1 and PDCCH candidate 2 corresponding to aggregation level m2, and TRP 1 may transmit PDCCH candidate 1 and TPR 2 may transmit PDCCH candidate 2. In this case, TRP 1 and TRP 2 may transmit PDCCH candidate 1 and PDCCH candidate 2 using different time/frequency resources. After receiving PDCCH candidate 1 and PDCCH candidate 2, the terminal may generate a PDCCH candidate corresponding to the merge level m1+m2 and attempt DCI decoding.

At this time, a scheme in which the same DCI is divided and transmitted to several PDCCH candidates may be implemented in the following two schemes.

In the first method, a DCI payload (e.g., control information+CRC) is encoded through one channel encoder (e.g., a polar encoder) and transmitted in two TRPs. That is, the first method refers to a method of dividing coded bits obtained according to an encoding result into two TRPs and transmitting them. Here, the entire DCI payload may be encoded in the coded bits transmitted by each TRP, but is not limited thereto, and only a part of the DCI payload may be encoded.

The second method is a method of dividing a DCI payload (e.g., control information+CRC) into two DCIs (e.g., DCI 1 and DCI 2) and then encoding each of them through a channel encoder (e.g., a polar encoder). Then, each of the two TRPs may transmit coded bits corresponding to DCI 1 and coded bits corresponding to DCI 2 to the UE.

That is, multiple base stations (M-TRPs) dividing/repeatedly transmitting the same PDCCH over multiple MOs (monitoring occasions) may mean that 1) coded bits encoding the entire DCI content of the corresponding PDCCH are repeatedly transmitted through each MO for each base station (S-TRP), 2) coded bits encoding the entire DCI content of the corresponding PDCCH are divided into a plurality of parts, and each base station (S-TRP) transmits different parts through each MO, or 3) the DCI content of the corresponding PDCCH is divided into a plurality of parts, and different parts are encoded (i.e., separately encoded) for each base station (S-TRP) and transmitted through each MO.

Repeatedly/divided transmission of the PDCCH may be understood as transmission of the PDCCH multiple times over several transmission occasions (TOs).

Here, TO may mean a specific time/frequency resource unit in which the PDCCH is transmitted. For example, when the PDCCH is transmitted multiple times (to a specific RB) over slots 1, 2, 3, and 4, TO may mean each slot. As another example, when the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, a different TCI state used for DMRS channel estimation may be configured for each TO, and TOs with different TCI states may be assumed to be transmitted by different TRPs/panels.

Repetitive or divided transmission of PDCCHs by a plurality of base stations means that PDCCHs are transmitted over multiple TOs, and the union of TCI states configured in the corresponding TOs is composed of two or more TCI states. For example, when the PDCCH is transmitted over TO 1, 2, 3, 4, TCI states 1, 2, 3, 4 may be configured in each of TO 1, 2, 3, 4, and it means that TRP i cooperatively transmitted the PDCCH in TO i.

In describing the present disclosure, if the UE repeatedly transmits the same PUSCH to a plurality of base stations (i.e., M-TRPs), it may mean that the UE transmits the same data through a plurality of PUSCHs, and each PUSCH may be transmitted while being optimized for UL channels of different TRPs.

For example, the UE may repeatedly transmit the same data through PUSCH 1 and PUSCH 2. At this time, PUSCH 1 is transmitted using UL TCI state 1 for TRP 1, and PUSCH may be transmitted by scheduling a value optimized for a channel of TRP 1 through link adaptation such as a precoder/MCS. PUSCH 2 is transmitted using UL TCI state 2 for TRP 2, and link adaptation such as a precoder/MCS is also scheduled with a value optimized for the channel of TRP 2, and PUSCH may be transmitted. In this case, PUSCH 1 and PUSCH 2 that are repeatedly transmitted may be transmitted at different times and may be TDM, FDM, or SDM.

Also, in describing the present disclosure, an operation in which the UE divides and transmits the same PUSCH to a plurality of base stations (i.e., M-TRP) may mean that one data is transmitted through one PUSCH, but resources allocated to the PUSCH are divided and transmitted in an optimized manner for UL channels of different TRPs.

For example, the UE may transmit the same data through 10 symbol PUSCH. At this time, the first 5 symbols among 10 symbols can be transmitted using UL TCI state 1 for TRP 1, and the UE may transmit a 5-symbol PUSCH (through TRP 1) by receiving a scheduling value optimized for link adaptation such as a precoder/MCS and a channel of TRP 1. The remaining 5 symbols may be transmitted using UL TCI state 2 for TRP 2, and the UE may transmit the remaining 5 symbol PUSCH (via TRP 2) by receiving a scheduling value optimized for link adaptation such as precoder/MCS and the channel of TRP 2.

In the above example, a method of dividing one PUSCH into time resources and TDM for transmission toward TRP 1 and transmission toward TRP 2 has been described. However, the present disclosure is not limited thereto, and the UE may divide and transmit the same PUSCH to a plurality of base stations by exclusively using the FDM/SDM scheme.

The UE may repeatedly transmit the PUCCH to a plurality of base stations (similar to PUSCH transmission) or divide and transmit the same PUCCH.

In addition, when multiple TOs are indicated to the UE for repeated or divided transmission of PDCCH/PDSCH/PUSCH/PUCCH, each TO may transmit UL toward a specific TRP or receive DL from a specific TRP. Here, UL TO (or, TO of TRP 1) transmitted toward TRP 1 may mean TO using the first value of two spatial relationships indicated to the UE, two UL TCIs, two UL power control parameters, or two PL (path-loss)-RSs. In addition, UL TO (or, TO of TRP 2) transmitted toward TRP 2 means TO using the second value of two spatial relationships indicated to the UE, two UL TCIs, two UL power control parameters, and two PL-RSs.

Similarly, during DL transmission, DL TO transmitted by TRP 1 (or TO of TRP 1) means TO using the first value of the two DL TCI states indicated to the UE (e.g., when two TCI states are configured in CORESET), and DL TO (or, TO of TRP 2) transmitted by TRP 2 may mean TO using the second value of the two DL TCI states indicated to the UE (for example, when two TCI states are configured in CORESET).

The present disclosure may be expanded and applied to various channels such as PUSCH/PUCCH/PDSCH/PDCCH. Additionally, the present disclosure may be extended and applied to both the case of repeatedly transmitting the channel to different space/time/frequency resources and the case of divided transmission.

M-TRP SFN (Single Frequency Network) Transmission Method

Improvements to the SFN transmission method in which M-TRP transmits the same data together through the same layer/same DMRS port in the same time/frequency domain are in progress.

For example, in the case of the layer 1 M-TRP SFN transmission method, TRP 1 and TRP 2 can transmit the same data to the UE using the same DMRS port and the same time/frequency resources. At this time, as the DL QCL beam information (i.e., QCL reference RS defined in TCI state) for DMRS is configured for each TRP, the DMRS port may receive both QCL beam information for TRP 1 and QCL beam information for TRP 2. Since the same data transmitted by two TRPs is received through one DMRS port, the channel estimated through the DMRS port may be a composite channel combining the DL channel of TRP 1 and the DL channel of TRP 2. At this time, because the channel phases of each TRP are not aligned with each other, a synthetic channel may be created by randomly performing a constructive sum or a destructive sum on the channels of each TRP.

Therefore, the SFN transmission method can be viewed as a type of M-TRP NCJT method, and since M-TRP transmits a common layer, it may be referred to as common layer NCJT.

NCJT (Non-Coherent Joint Transmission) Method

The NCJT method refers to a method in which multiple TPs (transmission points) transmit data to one UE using the same time and frequency, and data may be transmitted to different layers using different DMRS ports between TPs. TP may transmit data scheduling information to the UE receiving NCJT through DCI.

At this time, the method in which each TP participating in NCJT transmits scheduling information about the data it transmits to DCI may be referred to as multi-DCI-based NCJT. Since each of N TPs participating in NCJT transmission transmits DL grant DCI and PDSCH to the UE, the UE can receive N DCI and N PDSCH from N TPs.

Differently, a method in which one representative TP transmits scheduling information about the data it transmits and the data transmitted by other TPs through one DCI may be referred to as a single DCI-based NCJT. At this time, N TPs may transmit one PDSCH. At this time, each TP may transmit only some of the multiple layers that make up one PDSCH. For example, when 4-layer data is transmitted, TP 1 transmits layer 2, and TP 2 transmits the remaining 2 layers to the UE.

Hereinafter, the multi-DCI-based NCJT method and the single DCI-based NCJT method will be described in detail.

First, in the case of a single DCI-based M-TRP method, M-TRPs may cooperatively transmit one common PDSCH together, and each TRP participating in cooperative transmission may transmit the corresponding PDSCH by spatially dividing it into different layers (i.e., different DMRS ports). At this time, scheduling information for the PDSCH is indicated to the UE through one DCI, and the QCL RS and QCL type information used for each DMRS port may be indicated in the DCI.

At this time, the above-described method is different from the method of indicating the QCL RS and type to be commonly applied to all DMRS ports through DCI. That is, M TCI states are indicated through the TCI field in the DCI (in case of 2 TRP cooperative transmission, M=2), and the QCL RS and type may be identified for each M DMRS port group using the different M TCI states. Additionally, DMRS port information may be indicated using a new DMRS table.

In addition, in the case of the multi-DCI-based M-TRP method, each M-TRP may transmit a different DCI and PDSCH, and the corresponding PDSCHs may be transmitted (partially or entirely) overlapping each other on frequency/time resources. The corresponding PDSCHs are scrambled through different scrambling IDs, and the corresponding DCIs may be transmitted through CORESETs belonging to different CORESET groups.

Here, the CORESET group may identify the index defined within the CORESET configuration information corresponding to each CORESET. For example, the index is configured to 0 in the CORESET configuration information corresponding to CORESET 1 and 2, and if the index is configured to 1 in the CORESET configuration information corresponding to CORESET 3 and 4, CORESET 1 and 2 may belong to CORESET group 0, and CORESET 3 and 4 may belong to CORESET group 1.

Additionally, if the index is not defined on the configuration information corresponding to the CORESET, the index corresponding to the CORESET may be interpreted as 0. If multiple scrambling IDs are configured in one serving cell or two or more CORESET groups are configured, the UE may be determined to be receiving data using the multi-DCI-based M-TRP method.

For example, whether a single DCI-based M-TRP method or a multi-DCI-based M-TRP method may be indicated to the UE through separate signaling. For example, when multiple CRS patterns are indicated to the UE for M-TRP operation for one serving cell, depending on whether it is a single DCI-based M-TRP method or a multi-DCI-based M-TRP method, PDSCH rate matching for CRS (cell-specific reference signal) may vary. Here, a tracking reference signal (TRS) may be used as a function of CRS, and the UE may use TRS to estimate timing offset, delay spread, frequency offset, and Doppler spread.

Additionally, NCJT may be divided into fully overlapped NCJT, in which the time-frequency resources transmitted by each TP completely overlap, and partially overlapped NCJT, in which only some time-frequency resources overlap. That is, in the case of partially overlapped NCJT, data from both TP 1 and TP 2 can be transmitted in some time-frequency resources, and only data from either TP 1 or TP 2 may be transmitted in the remaining time-frequency resources.

In the case of the M-TRP NCJT transmission method, two TRPs may transmit different data using different layers/DMRS ports.

For example, DMRS ports belonging to different CDM groups may be grouped. In addition, a DMRS port belonging to the first CDM group may be received using the first QCL beam information (i.e., first TCI state indicated), and a DMRS port belonging to the second CDM group may be received using the second QCL beam information (i.e., indicated second TCI state).

As described above, since the layers/DRMS ports transmitted by the two TRPs are separate and data is not transmitted through a composite channel, there may be no need to align the channel phases of the two TRPs. The above method may be referred to as the (M-TRP) NCJT method, and may also be referred to as the independent layer NCJT method.

M-TRP CJT (Coherent Joint Transmission) Method

Similar to the M-TRP SFN method, in the case of the M-TRP CJT method, M-TRP may transmit the same data through the same layer/DMRS port for the same time/frequency region. However, unlike the M-TRP SFN method, in the M-TRP CJT method, the channel phases of each TRP are aligned with each other, so ideally, a constructive sum may be performed on the two channels to create a composite channel. Accordingly, when the M-TRP CJT method is applied, a higher SNR gain may be obtained through beamforming.

To ensure that the channel phases of each TRP are aligned with each other, the UE may feed back the phase difference between the two TRP channels by adding it to the CSI. Here, CSI may collectively refer to information that may indicate the quality of a wireless channel (or link) formed between a UE and an antenna port.

Additionally, when data is transmitted in multiple layers, some layers apply the CJT method, but some layers may only transmit one TRP. For example, when transmitting a rank 2 PDSCH, TRPs 1 and 2 in the first layer transmit the same data through the CJT method, but only TRP 1 may transmit data in the second layer.

Hereinafter, for CSI feedback for CJT transmission (i.e., CSI with co-phase for the DL channel of each TRP), a method of configuring CMR (channel measurement resource) and CSI content for a UE so that the base station can measure the channels of two TRPs is described.

Method 1

Method 1 relates to a method of performing a measurement operation on one concatenated channel through one CMR. Specifically, one CSI-RS may be configured to CMR, but some ports of the CSI-RS may be transmitted by TRP 1 and the remaining ports may be transmitted by TRP 2. When method 1 is used, some ports of the CSI-RS may be configured with QCL beam information for TRP 1 (or TCI state or QCL reference RS defined in the TCI state), and the remaining ports may be configured with QCL beam information for TRP 2.

By measuring the channel with the corresponding CMR, the UE may estimate a channel for a transmission (Tx) antenna port equal to the sum of the number of ports in TRP 1 and the number of ports in TRP 2. And, the UE may calculate the PMI for ports equal to the sum of the number of ports in TRP 1 and the number of ports in TRP 2. At this time, the calculated PMI reflects the optimal co-phase between the port of TRP 1 and the port of TRP 2, so the UE may feed back the calculated RI/PMI/CQI to the base station.

Method 2

Method 2 relates to a method of performing a measurement operation for one connected channel through two CMRs. Specifically, CMR 1 may be configured to CSI-RS 1 transmitted by TRP 1, and CMR 2 may be configured to CSI-RS 2 transmitted by TRP 2. The UE may estimate each of the TRP 1 channel and TRP 2 channel by measuring the channel with the corresponding CMR. Additionally, the UE may concatenate the estimated channels to create all channels of TRP 1 and TPR 2.

For example, the UE may estimate the 2-port channel of TRP 1 with CMR 1 and the 2-port channel of TRP 2 with CMR 2, and then connect each estimated channel to create a 4-port channel. The UE may calculate RI/PMI/CQI for the created channel (e.g., 4-port channel) and feed it back to the base station.

Method 3

Method 3 relates to a method of performing measurement operations for two channels through two CMRs. Specifically, in the case of method 3, two CMRs may be configured the same as method 2. However, unlike method 2, in method 3, the UE does not connect the channels measured through two CMRs. The UE may calculate RI 1/PMI 1 from the channel of CMR 1, RI 2/PMI 2 from the channel of CMR 2, and calculate the co-phase value between each channel. In addition, the UE may calculate the CQI that may be achieved when transmitting the CJT PDSCH using RI 1/PMI 1/RI 2/PMI 2/co-phase and feed back all the calculated values.

Hereinafter, in relation to methods 1 to 3 described above, proposed methods that may be considered in perspective of processing complexity for CMR and/or CSI-RS will be described.

Embodiment 1

Regarding to the above-described method 1, this embodiment relates to a method of performing CPU occupancy and/or UE capability reporting considering processing complexity that may increase compared to the existing method. When a base station and/or a UE performs a CSI reporting procedure according to the C-JT method, at least one of the examples described below may be applied.

Embodiment 1-1

In the case of method 1 described above, as different QCL beam information (e.g., QCL Type-D RS, etc.) is configured for each port group constituting one CSI-RS, the UE needs to perform channel estimation separately for each port group.

For example, the UE may configure a filter coefficient of a channel estimator using first CQL beam information and estimate a channel of the first port group based on the filter coefficient. In addition, the corresponding UE may configure filter coefficients of the channel estimator using the second CQL beam information and estimate a channel of the second port group based on the corresponding filter coefficients. As a result, the channel estimation complexity of the UE may increase approximately twice.

The number of CSI processing units (CPUs) used for CSI calculation of the UE may vary depending on the complexity of channel measurement/estimation, CSI calculation, and encoding.

Therefore, as described above, as the channel measurement/estimation complexity for the corresponding CSI-RS (i.e., the CSI-RS resource configured separately for each port group) increases, the corresponding CMR (i.e., the CSI-RS resource) may be configured/precised/defined to use/occupy more than one CPU (e.g., two or more CPUs).

Embodiment 1-2

Information on the total number of CPUs that can be supported by the UE is reported to the base station as capability information of the corresponding UE.

If the number of CPUs required for the CSI report(s) to be reported by the UE is greater than the number of remaining CPUs not currently used by the UE, the UE may not update/perform/report low priority CSI reports according to a priority rule (e.g., priority defined in section 5.2.5 of 3GPP TS 38.214). For example, the priority rule may be configured to have a high priority in the order of time domain reporting behavior, CSI contents, cell index, and CSI reporting configuration identification information (e.g., reportconfigID).

For example, in a situation where a UE is using 2 CPUs out of 5 CPUs and 3 CPUs remain, the UE may be configured to perform a first CSI report (e.g., CSI report 1) requiring one CPU and (additionally) a second CSI report (e.g., CSI report 2) requiring three CPUs. In this case, the first CSI report having a high priority (e.g., having a low CSI report configuration ID) may be updated, but the second CSI report may not be updated. That is, the UE may perform only the first CSI report having a high priority.

In the above example, when one CMR according to the above-described method 1 and one existing CMR are configured in the second CSI report (i.e., a CSI report that may not be reported according to the existing rules), methods described below may be considered to update at least some of the CSI of the second CSI report. Here, the CMR according to method 1 described above may mean a CMR for CJT-based CSI feedback, and the existing CMR may mean a CMR for existing CSI feedback (e.g., NCJT-based CSI feedback, non-CJT feedback).

The UE may be configured to update/report CSI (i.e., CJT CSI) using the CMR by prioritizing the CMR according to method 1 described above. As a specific example, it is assumed that CSI for CJT and CSI for non-CJT are configured together for a CSI report having the highest priority among CSI reports that have not been updated/reported due to an insufficient number of remaining CPUs. In this case, if the number of CPUs required for CSI for CJT is less than or equal to the remaining number of CPUs, the UE may update/report the CSI for CJT usage using the corresponding CPU.

Alternatively, conversely, the UE may be configured to update/report the CSI using the corresponding CMR, giving priority to the existing CMR. As a specific example, it is assumed that CSI for CJT and CSI for non-CJT are configured together for a CSI report having the highest priority among CSI reports that have not been updated/reported due to an insufficient number of remaining CPUs. In this case, if the number of CPUs required for CSI for non-CJT use is less than or equal to the remaining number of CPUs, the UE may update/report CSI for non-CJT usage using the corresponding CPU.

The method described in the present embodiment 1-2 may be applied to all of the CMR configuration methods in Method 2 and/or Method 3 as well as Method 1 described above by extension. In addition, the method described in this embodiment 1-2 may also be extended and applied to CSI for NCJT (i.e., a method of calculating two RI/PMI and one CQI from two CMRs (e.g., one CMR pair)), instead of CSI for CJT.

Embodiment 1-3

In the case of the existing method, as shown in Table 6 below, the UE may recognize/identify the number of active CSI-RSs and the number of active CSI-RS ports.

Table 6 shows an example of a description of the number of active CSI-RSs and the number of active CSI-RS ports and UE capability reporting.

TABLE 6

| |
|---|
| In any slot, the UE is not expected to have more active CSI-RS ports or active CSI-RS resources in active BWPs than reported as capability. NZP CSI-RS resource is active in a duration of time defined as follows. For aperiodic CSI-RS, starting from the end of the PDCCH containing the request and ending at the end of the PUSCH containing the report associated with this aperiodic CSI-RS. For semi-persistent CSI-RS, starting from the end of when the activation command is applied, and ending at the end of when the deactivation command is applied. For periodic CSI-RS, starting when the periodic CSI-RS is configured by higher layer signalling, and ending when the periodic CSI-RS configuration is released. If a CSI-RS resource is referred N times by one or more CSI Reporting Settings, the CSI-RS resource and the CSI-RS ports within the CSI-RS resource are counted N times. |

According to Table 6, the UE reports information on the number of active CSI-RS ports and the number of active CSI-RSs in the active BWP as capability information. If the number of active CSI-RSs and active CSI-RS ports is large, implementation complexity of the UE may increase in terms of performing channel estimation for the corresponding CSI-RS.

In this regard, in the case of method 1 described above, since QCL beam information is configured for each of a plurality of port groups constituting the CSI-RS, channel estimation complexity for the corresponding CSI-RS may be high. That is, in the case of a CSI-RS configured to CMR for CJT CSI calculation, channel estimation complexity may be higher than that of the existing CSI-RS. Accordingly, for a corresponding CSI-RS, the number of CSI-RS resources may be configured/defined to count as one or more (e.g., two).

In this case, the UE may consider the CMR configured for CJT CSI calculation, in relation to the UE capability report for the number of active CSI-RS ports and the number of active CSI-RS. For example, along with the existing UE capability report (e.g., a report corresponding to Table 6), the UE may be configured/defined to report by considering the number of active CSI-RS resources and/or active CSI-RS ports related to the CMR configured for the above-mentioned CJT CSI calculation. Alternatively, for another example, apart from the existing UE capability report (e.g., the report corresponding to Table 6), the UE may be configured/defined to additionally perform a UE capability report for the number of active CSI-RS resources and/or the number of active CSI-RS port related to the CMR configured for CJT CSI calculation.

Embodiment 1-4

In the case of the existing method (e.g., 3GPP Rel-15 UE feature 2-62, etc.), the UE may report the maximum number of DL RS resources for/corresponding active spatial relation info and active TCI state (By integrating this, it may be referred to as an active spatial parameter) for each CC as capability information.

In this case, the UE needs to track beam information of the RS(s) corresponding to the active TCI state and active spatial relation info. Therefore, if the number of RSs to be tracked by the UE increases, the implementation complexity of the UE may increase.

In this regard, in case of following method 1 described above, since QCL beam information (e.g., spatial parameter, RS) is configured for each of a plurality of port groups constituting the CSI-RS, tracking complexity of the corresponding QCL beam information of the UE may be high.

As a specific example, when a CSI-RS (or any other RS) having different QCL beam information for each port group is introduced, the corresponding RS may be configured as a reference RS for the TCI state or as a spatial relation RS for spatial relation info. In addition, the corresponding TCI state or the corresponding spatial relation info may be activated through MAC-CE. When activated in this way, the number of RS resources of the corresponding CSI-RS may be configured/defined to count as 1 or more (e.g. 2). This is because, although the actual number of CSI-RS resources is one, complexity for beam tracking increases as the corresponding CSI-RS has multiple beam information.

In this case, the UE may consider the CMR (i.e. CSI-RS resource) configured for CJT CSI calculation in relation to the UE capability report for the maximum number of DL RS resources associated with the active TCI state and active spatial relation info. For example, along with the existing UE capability report, the UE may be configured/defined to report by considering the number of CSI-RS resources (e.g., actually one, but one or more counted CSI-RS resource) according to the CMR configured for the above-mentioned CJT CSI calculation in this embodiment 1-4. Alternatively, for another example, the UE may be configured/defined to additionally perform UE capability report for the number of CSI-RS resources according to the CMR configured for the above-mentioned CJT CSI calculation in this embodiment 1-4, separately from the existing UE capability report.

Embodiment 1-5

In the case of the existing method (e.g., 3GPP Rel-15 UE feature 2-4, etc.), in control information or data transmission and reception, the UE may report the support number of active TCI states for each BWP for each Component Carrier (CC).

In this regard, in the case of method 1 described above, since QCL beam information (e.g., spatial parameter, RS) is configured for each of a plurality of port groups constituting the CSI-RS, the active TCI state for the UE is applicable to have a plurality of QCL beam information, and the tracking complexity for the corresponding QCL beam information may be high.

As a specific example, when a CSI-RS (or any other RS) having different QCL beam information for each port group is introduced, the corresponding RS may be configured as a reference RS for the TCI state. In this case, the number of corresponding active TCI states may be configured/defined to count as one or more (e.g., two). This is because the actual number of active TCI states is one, but complexity for beam tracking increases as the corresponding active TCI state has multiple beam information.

In this case, the UE may consider the CMR (i.e., CSI-RS resource) configured for CJT CSI calculation in relation to the UE capability report for the supported number of active TCI states. For example, along with the existing UE capability report, the UE may be configured/defined to report by considering the number of CSI-RS resources (e.g., actually one, but one or more counted CSI-RS resource) according to the CMR configured for the above-mentioned CJT CSI calculation in this embodiment 1-5. Alternatively, for another example, the UE may be configured/defined to additionally perform UE capability report for the number of CSI-RS resources according to the CMR configured for the above-mentioned CJT CSI calculation in this embodiment 1-5, separately from the existing UE capability report.

Embodiment 2

This embodiment relates to a method of performing CPU occupation in consideration of processing complexity that may be increased compared to the existing method in relation to the above-described method 2.

Here, when the base station and/or the UE performs the CSI reporting procedure according to the above-described C-JT method, CSI for one concatenated channel (or composed channel) based on two CMRs calculations may be performed. For example, among the two CMRs, a first CMR (e.g., CMR 0) may be set for TRP 1, and a second CMR (e.g., CMR 1) may be set for TRP 2.

For example, the UE may perform channel estimation from each CMR, and although twice the complexity is required in terms of channel estimation, the UE may calculate one CSI for the concatenated channel (or composed channel). That is, in terms of computational complexity required for RI/PMI/CQI, one CMR-based CSI computation complexity according to the existing method and two CMR-based CSI computation complexity according to method 2 described above may be the same or similar.

The number of CSI processing units (CPUs) used for CSI calculation may vary depending on the complexity of channel measurement/estimation, CSI calculation, and encoding. In the case of the CJT CSI method based on method 2 described above, the complexity of channel measurement/estimation is increased, but the complexity in terms of CSI calculation and/or encoding may be the same as or similar to that of the existing CSI method. Therefore, in the case of the CJT CSI method based on method 2 described above, even if two CMRs are configured, the UE may be configured/precised/defined to use/occupy less than two CPUs (e.g., 1, 1.5, etc.).

Embodiment 3

This embodiment relates to a method of assuming rank information according to the CJT method or the (independent) NCJT method when calculating the CSI of the UE, in relation to method 3 described above. Here, the rank information may be rank information (e.g., PDSCH rank) assumed when calculating transport block size (TBS).

For example, when the UE performs Channel Quality Indicator (CQI) calculation, the terminal may calculate TBS by assuming the modulation order indicated by the CQI index, the number of resource elements (REs) allocated to the PDSCH, the PDSCH rank, etc. At this time, the UE may assume a different PDSCH rank depending on whether the CQI calculation is for CJT CSI or (independent) NCJT.

As a specific example, for a given rank indicator (RI) 1 and RI 2, in the case of CJT CSI, the UE may be configured/defined to assume the PDSCH rank as max (RI 1, RI 2). In contrast, for given RI 1 and RI 2, in the case of (independent) NCJT CSI, the UE may be configured/defined to assume the PDSCH rank as sum (RI 1, RI 2).

In the case of CJT CSI, the transmission rank of TRP 1 and the transmission rank of TRP 2 may be different (i.e., RI 1 is different from RI 2), and in this case, layers corresponding to the smaller of RI 1 and RI 2 may be used for CJT transmission of TRP 1 and TRP 2. The remaining layer(s) (i.e., (larger value among RI 1 and RI 2)-(smaller value among RI 2 and RI 2)) may be used for transmission by one TRP. Here, one TRP may mean a TRP corresponding to a large RI value.

As an example, when RI 1 is 1 and RI 2 is 2, TRP 1 and TPR 2 may perform CJT transmission using layer 1 (e.g., 1st layer), and the remaining 1 layer (e.g., 2nd layer) may be used for transmission only by TRP 2. In this case, the total rank of the PDSCH is 2. As described above, in the case of CJT, the UE may calculate TBS by assuming that the rank of the PDSCH is max (RI 1, RI 2), and may calculate the CQI based on this. On the other hand, in the case of (independent) NCJT, since the two TRPs (i.e., TRP 1, TRP 2) transmit independent layers, the UE may assume the PDSCH rank to be sum (RI 1, RI 2).

Additionally, unlike the above-described example, in the case of CJT CSI, the UE may assume that the PDSCH rank is min (RI 1, RI 2), or a specific RI value among RI 1 and RI 2. Here, the specific RI value may be a pre-configured or pre-defined value based on the base station and regulations.

In addition, in the above-described embodiments (e.g., Embodiments 1 to 3), for convenience of description of the present disclosure, it was assumed that two TRPs participate in JT transmission, but, even if three or more TRPs transmit JT, the embodiments of the present disclosure may be extended and applied.

For example, when three TRPs perform JT transmission, three QCL beam information may be configured as three port groups are configured in CSI-RS for CMR. Alternatively, three CMRs may be grouped and configured by individually configuring the CSI-RS transmitted by each TRP to a CMR. In the latter case, the UE may estimate three channels from three CMRs and then create a concatenated channel. Additionally, the UE may operate as in Method 2 described above, or may operate as in Method 3 described above for calculating CSI for each channel.

When following method 3 described above, the co-phase value reported by the UE may be two instead of one, and the UE may be configured to report the co-phase of the second CMR and the co-phase of the third CMR based on the first CMR (or CMR of the lowest ID CSI-RS). Additionally, in this case, RI/PMI may also be composed of three each.

The examples (e.g., Embodiments 1-1 to 1-5) described in the embodiment according to Method 1 described above may be expanded and applied to the case of 3 TRP-based JT. For example, the above-mentioned CPU number count method, active CSI-RS resource number count method, active TCI status count method, DL RS resource count method in active TCI status and active spatial relation info for each CC, CSI reporting method according to CSI priority rule, or the like may also be applied in the case of 3 TRP-based JT. At this time, the above-mentioned number was counted as 1 or more (e.g., 2) in a 2 TRP-based JT, but it may be configured/defined to be counted as 3 in a 3 TRP-based JT or a larger value than in the case of a 2 TRP-based JT.

In 3 TRP-based JT, a larger value is defined than the CSI processing time related values (e.g., Z, Z') used in 2 TRP-based JT, so that the CSI processing time of the UE may be set/defined to be longer.

The method for counting the number of CPUs described in the embodiment according to method 2 (e.g., embodiment 2) described above may be expanded and applied to the case of 3 TRP-based JT. At this time, the above-mentioned number was counted as more than 1 and less than 2 in JT based on 2 TRP, but it may be set/defined to count more than 1 and less than 3 in 3 TRP-based JT. Additionally, a method of counting to use/occupy a larger number of CPUs depending on the number of TRPs may be considered.

The PDSCH rank assumption method described in the embodiment according to method 3 (e.g., embodiment 3) described above can be extended and applied to the case of 3 TRP-based JT. For example, in 3 TRP-based JT, in the case of CJT CSI for 3 RI values, the UE may use max (RI 1, RI 2, RI 3), min (RI 1, RI 2, RI 3), or may assume the PDSCH rank through a specific RI value. Additionally, in the case of (independent) NCJT CSI for three RI values, the UE may assume the PDSCH rank through sum (RI 1, RI 2, RI 3).

In the above-described embodiments of the present disclosure (e.g., Embodiments 1 to 3), QCL beam information may mean a QCL RS corresponding to a specific QCL type. For example, the QCL type may be QCL type A or QCL type D. For example, in frequency range (RF) 1 where QCL type D is unnecessary, multiple QCL RSs for QCL type A may be configured when configuring CSI-RS (or any other RS). Additionally, in FR 2, multiple QCL RSs may configured in QCL type A and multiple QCL RSs may be configured in QCL type D.

Additionally, with regard to the above-described embodiments of the present disclosure (e.g., Embodiments 1 to 3), QCL beam information in uplink may mean spatial relation RS and may mean UL PL-RS (PLRS). In other words, the UE may recognize/identify PLRS by port group for one RS, and accordingly, if there are two port groups, the UE may be configure to recognize and apply one RS, but two PLRS. In this case, a rule may be defined for the UE to select and apply one PLRS, or may be configured/indicated by the base station. Alternatively, a method may be considered in which both PLRS are used, but each is mapped to a channel/RS/transmission occasion (TO) transmitted through different TRPs according to the M-TRP scheme.

Figure 8:
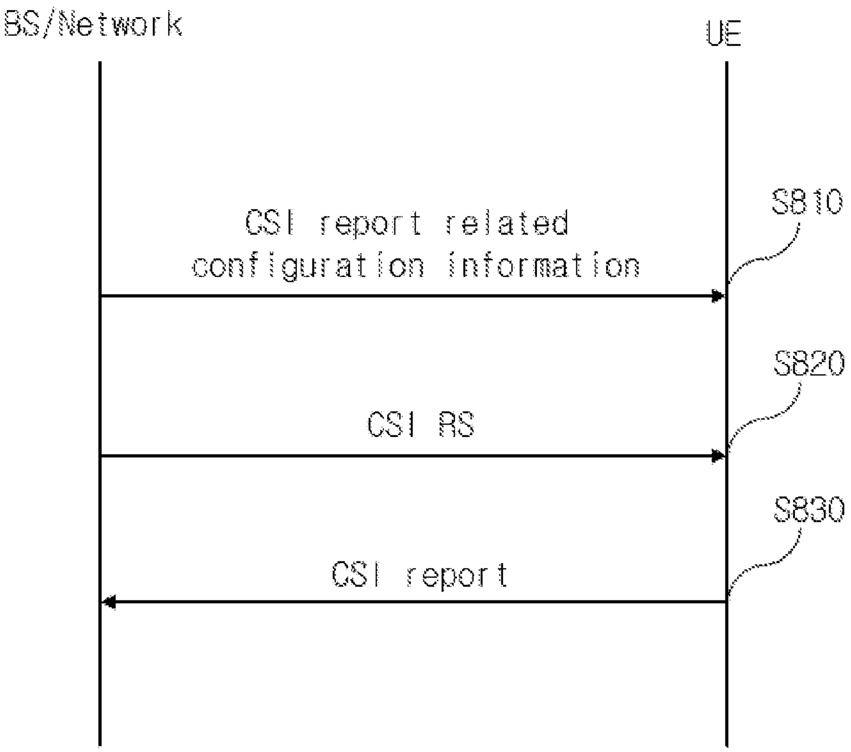
FIG. 8 is a diagram illustrating a signaling procedure between a base station and a UE for a method for transmitting and receiving channel state information according to an embodiment of the present disclosure.

FIG. 8 is a diagram illustrating a signaling procedure between a base station and a UE for a method of transmitting and receiving channel state information according to an embodiment of the present disclosure.

The example in FIG. 8 is for convenience of explanation and does not limit the scope of the present disclosure. Some step(s) illustrated in FIG. 8 may be omitted depending on the situation and/or setting. Additionally, the base station and the UE in FIG. 8 are only examples, and may be implemented as devices illustrated in FIG. 11 below. For example, the processors 102/202 of FIG. 11 may control transmission and reception of channels/signals/data/information, etc. using the transceivers 106/206, and may control to store transmitted or received channels/signals/data/information, etc. in the memory 104/204.

In addition, in the operation between the base station and the UE in FIG. 8, the above-described content may be referenced/used even if there is no separate mention.

A base station may refer to a general term for objects that transmit and receive data with a UE. For example, the base station may be a concept that includes one or more Transmission Points (TPs), one or more Transmission and Reception Points (TRPs), etc. Additionally, the TP and/or TRP may include a base station panel, a transmission and reception unit, etc. In addition, "TRP" may be applied in place of expressions such as refers to a panel, antenna array, cell (e.g., macro cell/small cell/pico cell, etc.), transmission point (TP), base station (gNB, etc.).

Referring to FIG. 8, for convenience of explanation, signaling between one base station and a UE is considered, but the signaling method may be expanded and applied to signaling between multiple TRPs and multiple UEs. In the following description, a base station may be interpreted as one TRP. Alternatively, the base station may include multiple TRPs, or may be one cell including multiple TRPs.

In step S810, the base station may transmit configuration information related to CSI reporting to the UE.

The configuration information may include configuration information on the above-described CSI-related operations, CSI-related resource configuration (e.g., resource settings, resource setting configuration, CSI-RS resource configuration, etc.), CSI reporting (e.g., CSI reportQuantity, etc.), and/or CSI calculation (e.g., configuration/definition of CPU occupancy), etc.

For example, the configuration information may include information on a CMR configuration for CSI-RS resources, a configuration for CSI reporting (e.g., CSI-reportConfig), an association configuration between CSI-RS resources and spatial parameters, etc.

As an example, the above-described configuration information may be transmitted and received through higher layer signaling (e.g., RRC signaling, etc.).

In step S820, the base station may transmit a CSI-RS to the UE. That is, the UE may receive CSI-RS from at least one CSI-RS resource based on/corresponding to the configuration information in step S810. For example, as in the above-described embodiments, the at least one CSI-RS may be configured as a resource for channel measurement (e.g., CMR) or as a resource for interference measurement (e.g., IMR).

For example, as in Method 1 and Embodiment 1 described above, a specific CSI-RS resource among at least one CSI-RS resource may be configured as one channel measurement resource (CMR). In this case, the CMR may be divided into two port groups (e.g., a first port group and a second port group). Here, the first port group and the second port group may be associated with a first spatial parameter and a second spatial parameter, respectively.

As an example, the first spatial parameter and the second spatial parameter may correspond to a TCI state or spatial relation info. Additionally, each of the first spatial parameter and the second spatial parameter may include at least one of a QCL RS corresponding to quasi co-located (QCL) type A or a QCL RS corresponding to QCL type D.

Additionally, the first spatial parameter and the second spatial parameter may be associated with different CORESET pool indices. That is, the first spatial parameter and the second spatial parameter may be associated with different TRPs, and in this case, the UE may identify/recognize that the CMR is for CJT CSI reporting by different TRPs, through this CMR configuration.

In step S830, the UE may transmit/report CSI to the base station. Here, the corresponding CSI may be calculated based on the configuration information in step S810 and the CSI-RS in step S820.

For example, as described above, if a specific CSI-RS resource among at least one CSI-RS resource is set to one CMR, and the corresponding CMR (i.e., CSI-RS resource) may be distributed into two port groups, the UE may calculate the CSI for the corresponding CMR based on the first port group and the second port group (e.g., Method 1 and Embodiment 1). Alternatively, the UE may calculate CSI based on the method described in other methods and embodiments of the present disclosure (e.g., Method 2, Method 3, Embodiment 2, Method 3, etc.).

For example, as in Embodiment 1-1 described above, CSI calculation for the one CMR may occupy a number of CSI processing units (CPUs) exceeding 1.

For example, as in Example 1-2 described above, it may happen that only some CSIs (e.g., CSI for CJT purposes, or CSI for NCJT purposes) are reported, in relation to CSI priority rules. Specifically, if the number of CPUs for CSI based on at least one CSI-RS resource is greater than the number of remaining CPUs of the UE, CSI reports associated with CSI based on the at least one CSI-RS resource may be dropped. However, if the number of CPUs for CSI based on the specific CSI-RS resource is less than or equal to the number of remaining CPUs of the UE, the UE may calculate and transmit/report only the CSI for the one CMR (e.g., CSI for CJT purposes).

Also, for example, although not shown in FIG. 8, as in Example 1-3 described above, the UE may transmit/report UE capability information including information on the number of active CSI-RS resources to the base station. At this time, if the UE capability information is related to the specific CSI-RS resource, the number of active CSI-RS resources corresponding to the specific CSI-RS resource may be counted in excess of 1 (e.g., counted as 2).

In addition, for example, although not shown in FIG. 8, as in Examples 1~4 described above, the UE may transmit/report UE capability information including information on the maximum number of downlink reference signal (downlink RS) resources in at least one of the active TCI state or active spatial relation info to the base station. At this time, if the UE capability information is related to the specific CSI-RS resource, the number of specific CSI-RS resources may be counted in excess of 1 (e.g., counted as 2).

In addition, for example, although not shown in FIG. 8, as in Example 1-5 described above, the UE may transmit/report UE capability information including information on the number of active TCI states supported for each bandwidth part. At this time, if the UE capability information is related to the specific CSI-RS resource, the number of active TCI states associated with that specific CSI-RS resource may be counted in excess of 1 (e.g., counted as 2).

In addition, based on the examples described in Embodiment 2 and Embodiment 3 described above, the UE may configure CPU usage/occupancy for CSI calculation, and the UE may assume/identify/determine rank information (e.g., PDSCH rank) related to TBS calculation.

Figure 9:
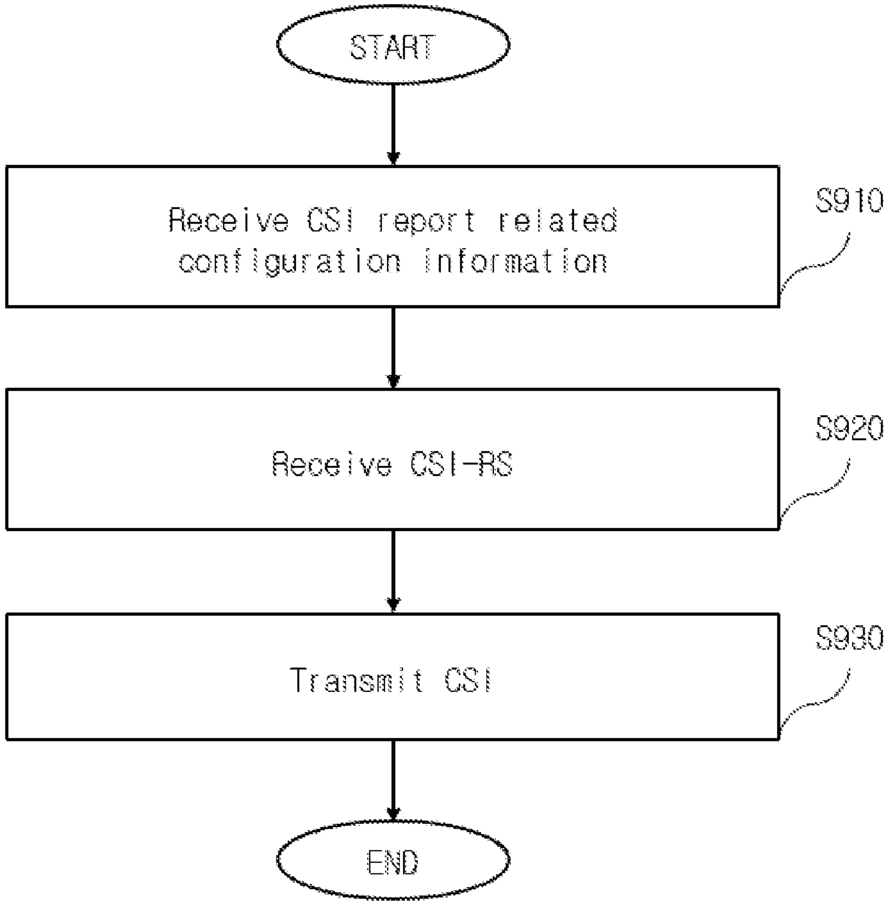
FIG. 9 is a diagram illustrating an operation of a UE for a method for transmitting and receiving channel state information according to an embodiment of the present disclosure.

FIG. 9 is a diagram illustrating the operation of a UE for a method for transmitting and receiving channel state information according to an embodiment of the present disclosure.

In FIG. 9, the operation of the UE based on the previously proposed method (e.g., any one or more (detailed) implementations of the above Embodiment 1, Embodiment 2, Embodiment 3, and FIG. 8 and any one of the detailed embodiments thereof, or a combination of one or more (detailed) embodiments) is exemplified. The example of FIG. 9 is for convenience of description and does not limit the scope of the present disclosure. Some step(s) illustrated in FIG. 9 may be omitted depending on circumstances and/or configuration. In addition, the UE of FIG. 9 is only one example, and may be implemented as a device illustrated in FIG. 11 below. For example, the processor 102/202 of FIG. 11 may control to transmit and receive channel/signal/data/information, etc. (e.g., RRC signaling, MAC CE, DCI scheduling UL/DL, SRS, PDCCH, PDSCH, PUSCH, PUCCH, PHICH, etc.) through the transceiver 106/206, and may control to store the transmitted or received channels/signals/data/information, etc. in the memory 104/204.

Figure 11:
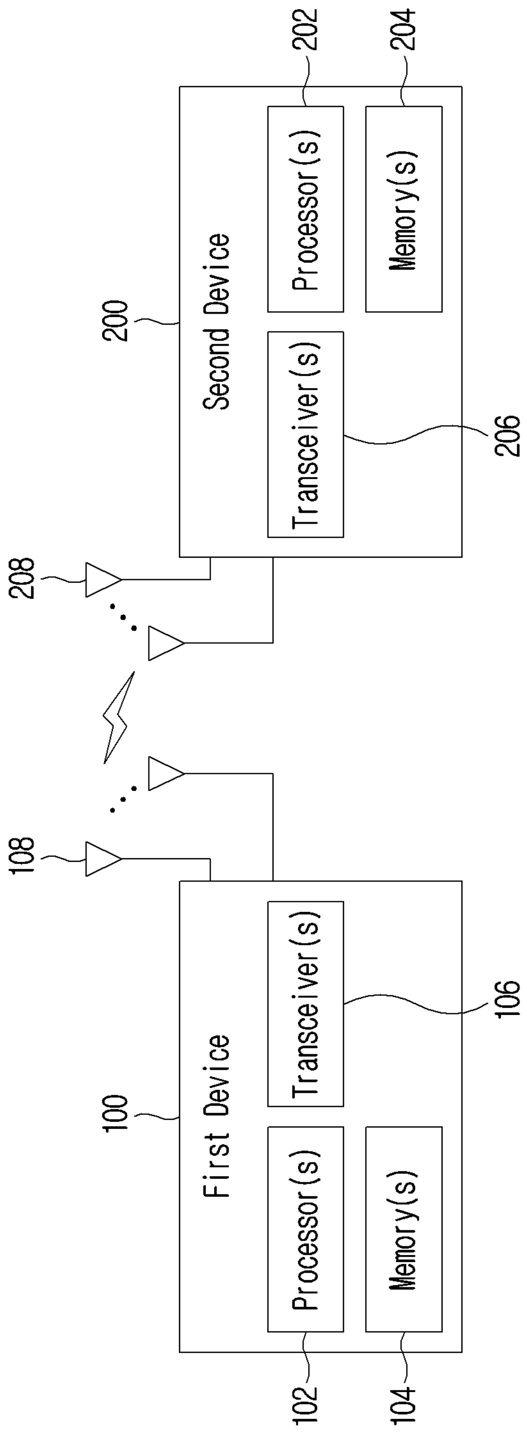
FIG. 11 is a diagram which illustrates a block diagram of a wireless communication device according to an embodiment of the present disclosure.

In addition, the operation of FIG. 9 may be processed by one or more processors 102 and 202 of FIG. 11, and the operation of FIG. 9 may be stored in a memory (e.g., one or more memories 104 and 204 of FIG. 11) in the form of a command/program (e.g., instruction or executable code) for driving at least one processor (e.g., 102 and 202) of FIG. 11.

Referring to FIG. 9, in step S910, the UE may receive configuration information related to CSI reporting.

Here, the corresponding configuration information may correspond to configuration information (e.g., configuration information by higher layer signaling) related to the above-described embodiment 1, embodiment 2, and/or embodiment 3. That is, the configuration information may include parameter(s) for applying the proposed method (e.g., Embodiment 1, Embodiment 2, and/or Embodiment 3).

The corresponding configuration information may correspond to the CSI reporting-related configuration information described in step S810 of FIG. 8, and detailed description of overlapping contents will be omitted.

In step S920, the UE may receive CSI-RS. Here, the corresponding CSI-RS may be at least one CSI-RS transmitted and received in a CSI-RS resource corresponding to/based on the configuration information in step S910.

The contents of the corresponding CSI-RS reception may correspond to the CSI-RS transmission and reception described in step S820 of FIG. 8, and detailed description of the overlapping contents will be omitted.

In step S930, the UE may transmit CSI. Here, the corresponding CSI may be calculated and reported/transmitted based on the configuration information in step S910 and the CSI-RS in step S920.

The contents of the CSI calculation and transmission/reporting may correspond to the CSI calculation and transmission/reporting described in relation to step S830 of FIG. 8, and detailed description of overlapping contents will be omitted.

Additionally, although not shown in FIG. 9, the UE may transmit/report capability information of the UE to the base station. As an example, the UE may transmit/report UE capability information on the number of active CSI-RS resources, the maximum number of downlink reference signal (downlink RS) resources in at least one of active TCI state or active spatial relation info, the support number of active TCI state for each bandwidth part, or the like.

The contents of the transmission/reporting of the corresponding UE capability information may correspond to the example(s) of transmission/reporting of the UE capability information described in FIG. 8, and detailed description of overlapping contents will be omitted.

Figure 10:
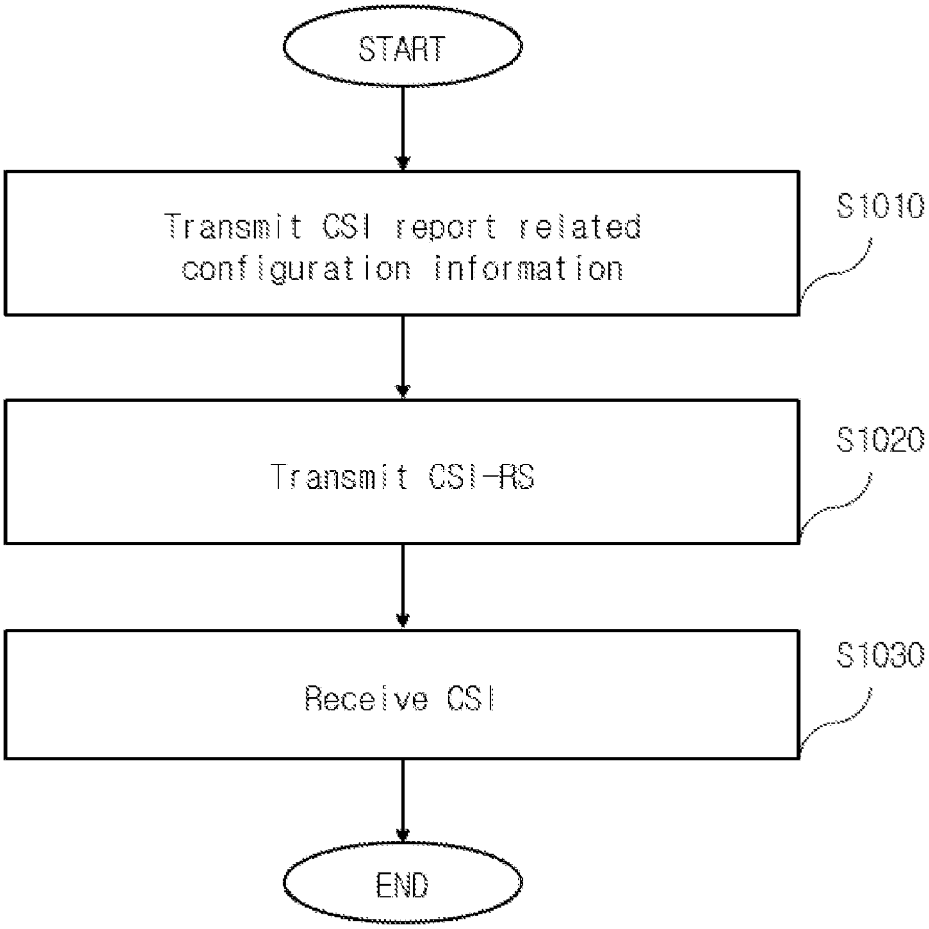
FIG. 10 is a diagram illustrating an operation of a base station for a method for transmitting and receiving channel state information according to an embodiment of the present disclosure.

FIG. 10 is a diagram illustrating the operation of a base station for a method for transmitting and receiving channel state information according to an embodiment of the present disclosure.

In FIG. 10, the operation of the base station based on the previously proposed method (e.g., any one or more (detailed) implementations of the above Embodiment 1, Embodiment 2, Embodiment 3, and FIG. 8 and any one of the detailed embodiments thereof, or a combination of one or more (detailed) embodiments) is exemplified. The example of FIG. 10 is for convenience of description and does not limit the scope of the present disclosure. Some step(s) illustrated in FIG. 10 may be omitted depending on circumstances and/or configuration. In addition, the base station of FIG. 10 is only one example, and may be implemented as a device illustrated in FIG. 11 below. For example, the processor 102/202 of FIG. 11 may control to transmit and receive channel/signal/data/information, etc. (e.g., RRC signaling, MAC CE, DCI scheduling UL/DL, SRS, PDCCH, PDSCH, PUSCH, PUCCH, PHICH, etc.)

through the transceiver 106/206, and may control to store the transmitted or received channels/signals/data/information, etc. in the memory 104/204.

In addition, the operation of FIG. 10 may be processed by one or more processors 102 and 202 of FIG. 11, and the operation of FIG. 10 may be stored in a memory (e.g., one or more memories 104 and 204 of FIG. 11) in the form of a command/program (e.g., instruction or executable code) for driving at least one processor (e.g., 102 and 202) of FIG. 11.

Referring to FIG. 10, in step S1010, the base station may transmit configuration information related to CSI reporting.

Here, the corresponding configuration information may correspond to configuration information (e.g., configuration information by higher layer signaling) related to the above-described embodiment 1, embodiment 2, and/or embodiment 3. That is, the configuration information may include parameter(s) for applying the proposed method (e.g., Embodiment 1, Embodiment 2, and/or Embodiment 3).

The corresponding configuration information may correspond to the CSI reporting-related configuration information described in step S810 of FIG. 8, and detailed description of overlapping contents will be omitted.

In step S1020, the base station may transmit CSI-RS. Here, the corresponding CSI-RS may be at least one CSI-RS transmitted and received in a CSI-RS resource corresponding to/based on the configuration information in step S1010.

The contents of the corresponding CSI-RS reception may correspond to the CSI-RS transmission and reception described in step S820 of FIG. 8, and detailed description of the overlapping contents will be omitted.

In step S1030, the base station may transmit CSI. Here, the corresponding CSI may be calculated and reported/transmitted based on the configuration information in step S1010 and the CSI-RS in step S1020.

The contents of the CSI calculation and transmission/reporting may correspond to the CSI calculation and transmission/reporting described in relation to step S830 of FIG. 8, and detailed description of overlapping contents will be omitted.

Additionally, although not shown in FIG. 10, the base station may receive capability information of the UE. As an example, the base station may receive UE capability information on the number of active CSI-RS resources, the maximum number of downlink reference signal (downlink RS) resources in at least one of active TCI state or active spatial relation info, the support number of active TCI state for each bandwidth part, or the like.

The contents of the transmission/reporting of the corresponding UE capability information may correspond to the example(s) of transmission/reporting of the UE capability information described in FIG. 8, and detailed description of overlapping contents will be omitted.

General Device to which the Present Disclosure May be Applied

FIG. 11 illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:

receiving configuration information for a channel state information (CSI) report;

receiving a CSI-RS on a CSI-reference signal (RS) resource related to the configuration information; and transmitting CSI based on the CSI-RS and the configuration information, wherein, based the CSI-RS resource being configured as one channel measurement resource (CMR), CSI for the one CMR is calculated based on a first port group and a second port group of the CSI-RS resource, wherein the first port group and the second port group are associated with a first spatial parameter and a second spatial parameter, respectively, wherein the CSI includes a single precoding matrix indicator for the first port group and the second port group, and wherein CSI calculation for the one CMR occupies more than one CSI processing units (CPUs).

2. The method of claim 1, further comprising, transmitting user equipment (UE) capability information including information on a number of active CSI-RS resources, wherein, based on the UE capability information being related to the CSI-RS resource, a number of active CSI-RS resources corresponding to the CSI-RS is counted in excess of 1.

3. The method of claim 1, further comprising, transmitting UE capability information including information on a maximum number of downlink RS resources in at least one of an active TCI state or active spatial relation info, wherein, based on the UE capability information being related to the CSI-RS resource, a number of the CSI-RS resource is counted in excess of 1.

4. The method of claim 1, further comprising, transmitting UE capability information including information on a number of supports of active TCI states for each bandwidth part, wherein, based on the UE capability information being related to the CSI-RS resource, a number of active TCI states associated with the CSI-RS is counted in excess of 1.

5. The method of claim 1, wherein, based on that a number of CPUs for CSI based on the CSI-RS resource is greater than a remaining number of CPUs of the UE, a CSI report associated with the CSI based on the CSI-RS resource is dropped.

6. The method of claim 5, wherein, based on a number of CPUs for CSI based on the CSI-RS resource being less than or equal to a remaining CPU number of the UE, CSI for the one CMR is only calculated and reported.

7. The method of claim 1, wherein the first spatial parameter and the second spatial parameter correspond to TCI state or spatial relation info.

8. The method of claim 1, wherein each of the first spatial parameter and the second spatial parameter includes at least one of a quasi co-located (QCL) RS corresponding to QCL type A or a QCL RS corresponding to QCL type D.

9. The method of claim 1, wherein the first spatial parameter and the second spatial parameter are associated with different control resource set (CORESET) pool indexes.

10. An apparatus for a user equipment (UE), the apparatus comprising:

at least one transceiver; and at least one processor coupled with the at least one transceiver, wherein the at least one processor is configured to:

receive configuration information for a channel state information (CSI) report;

receive a CSI-RS on a CSI-reference signal (RS) resource related to the configuration information; and transmit CSI based on the CSI-RS and the configuration information, wherein, based the CSI-RS resource being configured as one channel measurement resource (CMR), CSI for the one CMR is calculated based on a first port group and a second port group of the CSI-RS resource, wherein the first port group and the second port group are associated with a first spatial parameter and a second spatial parameter, respectively, wherein the CSI includes a single precoding matrix indicator for the first port group and the second port group, and wherein CSI calculation for the one CMR occupies more than one CSI processing units (CPUs).

11. An apparatus for a base station, the apparatus comprising:

at least one transceiver; and at least one processor coupled with the at least one transceiver, wherein the at least one processor is configured to:

transmit configuration information for a channel state information (CSI) report;

transmit a CSI-RS on a CSI-reference signal (RS) resource related to the configuration information; and receive CSI based on the CSI-RS and the configuration information, wherein, based the CSI-RS resource being configured as one channel measurement resource (CMR), CSI for the one CMR is calculated based on a first port group and a second port group of the CSI-RS resource, wherein the first port group and the second port group are associated with a first spatial parameter and a second spatial parameter, respectively, wherein the CSI includes a single precoding matrix indicator for the first port group and the second port group, and wherein CSI calculation for the one CMR occupies more than one CSI processing units (CPUs).

* * * * *